Oct. 8, 1929.  F. J. STOBBA  1,730,391
COMBINATION KITCHEN CABINET AND TABLE
Filed April 14, 1925
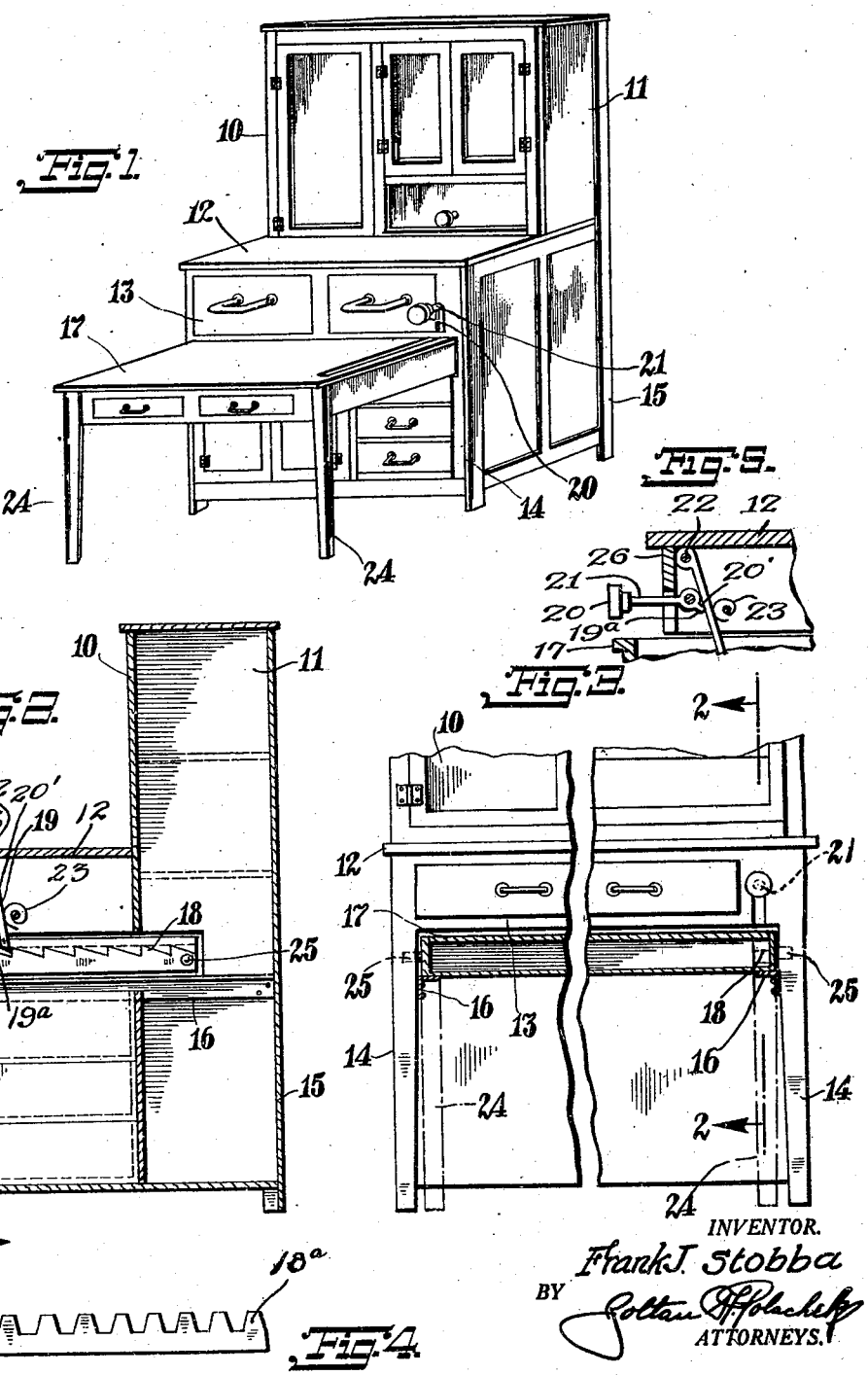
INVENTOR.
Frank J. Stobba
BY
ATTORNEYS.

Patented Oct. 8, 1929

1,730,391

UNITED STATES PATENT OFFICE

FRANK J. STOBBA, OF ASHTON, NEBRASKA

COMBINATION KITCHEN CABINET AND TABLE

Application filed April 14, 1925. Serial No. 22,931.

This invention relates to improvements in a combination kitchen cabinet and table in which the table is slidably connected to the cabinet.

One of the objects of my improvement is to provide an extensible table to be enclosed by a cabinet when required and to be extended therefrom when desired.

Another object of my improvement is to provide a means for locking the table in position when partly extended and a means for releasing the same, thereby controlling the degree of extension of said table.

A further object is to provide suitable guides for said table and to make my combination kitchen cabinet and table simple, durable and inexpensive.

Other objects and advantages will hereinafter appear.

I attain these objects by the combination kitchen cabinet and table illustrated in the accompanying drawings or by any mechanical equivalent or obvious modification of the same.

In the drawings Fig. 1 is a perspective view of my kitchen cabinet and table with the table portion extended.

Fig. 2 is a vertical section on the line 2—2 of Fig. 3 with the table portion retracted.

Fig. 3 is a vertical section on the line 3—3 of Fig. 2.

Fig. 4 is a detail of a modification of the rack shown in Fig. 2.

Fig. 5 is a fragmentary enlarged detail view of a portion of Fig. 2.

Similar numerals refer to similar parts throughout the several views; 10 designates the body of the kitchen cabinet, which comprises a vertical part or closet 11 and a horizontal extension 12, containing suitable drawers 13.

The horizontal extension 12 rests on the front legs 14 the rear legs 15 are supporting the weight of the rear of said extension 12 and also the closet 11.

Guides 16 are secured to the inner side of the legs 14 and 15 as shown in Fig. 3, to support a slidable table 17, which telescopes with said extension 12, and rests in said guides 16.

The front part of the table 17 is supported by the legs 24.

The table 17 is shown in Fig. 2 as having secured to one side thereof the rack with buttressed teeth 18 which is in engagement with the pawl 19, to keep the table 17 adjustably in position and from being withdrawn from its position in the extension 12 unless released by proper manipulation of the button 20, which actuates the pawl 19 by means of the rod 21, which is pivotally connected at 22 to the side of the cabinet and is normally kept in position by the spring 23, which resists the motion of the table into the extension 12, but does not prevent it altogether, as shown in Fig. 2.

A projection 19ª is provided on the pivoted end of the rod 21 in position to engage the cam surface 20' of the pawl 19 causing the latter to be moved against the action of the spring 23 and out of the path of the teeth 18. When the handle is released from the depressed position the spring 23 acting upon the pawl 19 returns the rod 21 to its normal substantially horizontal position and positions the end of the pawl 19 in the path of the teeth 18 preventing further extension of the table.

The rod 21 when in its normal horizontal position is arrested by engagement with the front member 26 of the extension 12 thus preventing upward rotation of the rod 21. When the rod 21 is thus disposed horizontally the projection 19ª at the end of the rod holds the pawl 19 against the teeth. In Figs. 1, 2 and 3 the rod 21 is shown in its normal horizontal position.

To prevent the table 17 also from being moved inwardly into the extension 12, if desired, without manipulating the push button 20, the rack 18, shown in Fig. 4, may be employed instead of rack 18, which allows motion in one direction.

To prevent the table 17 from being removed from the extension 12 altogether I provide the stops 25, which may be secured to the sides of the table 17 at the inner end thereof, to be intercepted by the legs 14 of the extension 12.

Modifications are possible and parts of my invention may be used without other parts.

Having thus described my invention, what I claim as new and desire to protect by Letters Patent of the United States is as follows:

1. In a combination kitchen cabinet and table, having a rack element secured to said table, the combination of a pawl pivotally mounted in said cabinet, and engageable with said rack, a rod formed with an extension member, the rod being pivotally mounted in said cabinet, said extension member abutting against said pawl to lock the latter against said rack element, and a spring normally urging said pawl against said extension member, said rod projecting through a slot in said cabinet.

2. In a combination kitchen cabinet and table, a rack element secured to said table, a pawl pivotally mounted in said cabinet, a spring acting against the pawl for resiliently holding said pawl in the path of rack, a rod pivotally mounted in said cabinet and extending through a slot therein, and a projection on the end of said rod in engagement with said pawl for moving the latter out of the path of said rack against the action of said spring when said rod is depressed, said rod being adapted to engage the upper end of said slot for arresting upward rotation thereof to position the rod substantially horizontal for retaining said pawl in a predetermined position relative to said rack.

In testimony whereof I have affixed my signature.

FRANK J. STOBBA.